US007480796B2

(12) United States Patent
Kwan (10) Patent No.: US 7,480,796 B2
(45) Date of Patent: Jan. 20, 2009

(54) SYSTEM AND METHOD FOR AUTHENTICATING DATA USING INCOMPATIBLE DIGEST FUNCTIONS

(75) Inventor: John Man Kwong Kwan, Sunnyvale, CA (US)

(73) Assignee: Kwan Sofware Engineering, Inc., Santa Clara, CA (US)

( * ) Notice: Subject to any disclaimer, the term of this patent is extended or adjusted under 35 U.S.C. 154(b) by 603 days.

(21) Appl. No.: 10/102,507

(22) Filed: Mar. 19, 2002

(65) Prior Publication Data

US 2002/0188849 A1   Dec. 12, 2002

Related U.S. Application Data

(60) Provisional application No. 60/296,820, filed on Jun. 7, 2001.

(51) Int. Cl.
*H04L 9/00* (2006.01)
*G06F 12/14* (2006.01)
*G06F 7/04* (2006.01)

(52) U.S. Cl. .................. 713/161; 713/165; 713/181; 713/187; 713/189; 726/26

(58) Field of Classification Search .................. 713/161
See application file for complete search history.

(56) References Cited

U.S. PATENT DOCUMENTS 5,204,966 A * 4/1993 Wittenberg et al. ............. 726/6
5,568,554 A * 10/1996 Eastlake, 3rd ............... 713/181
6,005,936 A * 12/1999 Shimizu et al. ............. 713/176
6,275,919 B1 * 8/2001 Johnson ...................... 711/216
6,847,647 B1 * 1/2005 Wrenn ................... 370/395.32
2005/0102520 A1 * 5/2005 Baxter et al. ................ 713/176

FOREIGN PATENT DOCUMENTS

WO   WO9847259    * 10/1998
WO   WO02091145 A1 * 11/2002
WO   W02007072468 A1 * 6/2007

OTHER PUBLICATIONS

Harrington et al, Cryptographic Access Control in a Distributed File System, 2003, ACM, pp. 158-165.*
Wires et al, Secure File System Versioning at the Block Level, 2007, ACM, pp. 203-215.*
Chen et al, Tamper-proofing Basis Path by Using Oblivious Hashing on Java, 2007, ACM, pp. 9-16.*

* cited by examiner

*Primary Examiner*—Ayaz R Sheikh
*Assistant Examiner*—Aravind K Moorthy
(74) *Attorney, Agent, or Firm*—GSS Law Group (57) ABSTRACT

A system for authenticating data of interest includes a digest locator engine capable to locate a first and a second digest result in a data file, including a set of data; a first digest creator capable to create, using a first digest function, a first digest of the set of data, the first digest function being identical to a digest function used to create the first digest result; a second digest creator capable to create, using a second digest function that is incompatible with the first digest function, a second digest of the set of data, the second digest function being identical to a second digest function used to create the second digest result; and a digest comparator engine, communicatively coupled to the digest locator, first digest creator and the second digest creator, capable to compare the first and second created digests with the first and second located digest results respectively.

62 Claims, 9 Drawing Sheets

Fig. 9. Hiding Digest Results After the End of a File.

Fig 10. Hiding Digest Results Within a Data File

Fig 11. Hiding the data of Interest After a Decoy File

Fig. 12. Using Multiple Decoy Files to Hide the Data of Interest

SYSTEM AND METHOD FOR AUTHENTICATING DATA USING INCOMPATIBLE DIGEST FUNCTIONS

CROSS-REFERENCE TO PRIORITY APPLICATION

This application claims priority to and incorporates by reference U.S. provisional application Ser. No. 60/296,820, entitled "System and Method for Creating, Attaching and Using Digests of Data to Authenticate the Data," by John Man Kwong Kwan, filed on Jun. 7, 2001.

BACKGROUND

1. Field of the Invention

This invention relates to methods of data authentication and more particularly, but not exclusively, provides a system and method for creating, attaching, and using digest results of digital data to authenticate the data.

2. Description of Related Art

Information that is used by computers is often stored in digital data files of various formats. A digital file refers to digital data that together and as a group have meaning or use to a party in possession of the file. A computer file refers to digital data that can be stored as a file on a medium such as a hard disk, a flash memory card, random access memory (RAM), read-only memory (ROM), CD-ROM, DVD-ROM, or any other medium or device designed to store data in digital form.

Digital files can be transported by wireless means, such as over a cellular phone or wireless modem, or through a wire such as over the Internet, a wired modem, a local area network (LAN), a wide area network (WAN), a virtual private network (VPN), or any other similar means.

Because digital data can be easily modified, it is often important to be able to verify the integrity of the file to confirm that the file or a subset of the file has not been altered. The important data to be verified, which may consist of the entire file or a subset of it, is referred to as "data of interest."

One conventional way to verify the integrity of the data of interest has been to generate a data file that contains both the data of interest and a redundant copy of the data of interest encrypted in such a way that a comparison may be made between the data of interest and the redundant data. The comparison may be made by decrypting the redundant data and comparing the decrypted redundant data with the unencrypted data of interest in the file. Alternatively, the same encryption algorithm used to encrypt the redundant data may be applied to the data of interest and the newly encrypted version of the data of interest may be compared against the stored encrypted redundant data. These techniques have the drawback of requiring the storage of two copies of the digital data and are not desirable for large data files.

Another conventional technique involves applying a digest function to the data of interest to create a digest result. A digest result is a shorthand way of representing the data. Examples of a digest function include a simple checksum, a weighted checksum, bit operations, or other functions. In a simple checksum, all the bytes of the data of interest are added together and stored in an integer where the overflow bits are dropped (e.g., a CRC). In a weighted checksum, each byte of data is multiplied by a weight factor before being added to the other bytes. In bit operations technique, each byte of data of interest is subjected to various operations. For example, each byte of data may be subjected to an exclusive or (XOR) operation with a subsequent byte of data, and the result XOR'ed with the next byte until all the bytes of the data of interest are exhausted. The resulting value is the digest result.

Since all bytes of the data of interest are used to calculate a digest result, if one or more bytes are altered to another value, a user can detect that a change has occurred. If the user reapplies the digest function to the changed data, the digest result will not match the digest result calculated from the original data. The ability to compare the recalculated digest result against the original digest result and noting the difference if the data of interest has been changed allows the user to authenticate the data and detect if any alterations have occurred.

However, using a digest function has drawbacks. A digest function may map multiple sets of data into the same digest result. Therefore, a digest result calculated for an altered, forged set of data may be equal to the digest result calculated for the authentic set of data. To pass a forged set of data as authentic, it is possible to analyze the digest function to find out which sets of data that are different from the authentic data set yield the same digest result as the authentic set. The data of interest cannot be authenticated with any reliability if a digest function alone is used.

An example follows that demonstrates how using a digest function may yield the same digest result for different data sets. In this example, a weighted checksum is used as the digest function. Two different sets of data are subjected to this digest function. The authentic set contains the values of 1, 3, 5, and 2 and the forged set contains the values 3, 2, 5, and 2. The weighted sum uses weight of 2 and 4 multiplied by the data values and repeats the multiplications periodically until all data is exhausted:

$$2*1+4*3+2*5+4*2=32 \qquad 1)$$

$$2*3+4*2+2*5+4*2=32 \qquad 2)$$

Application of this digest function to both sets of data yields the same digest result of 32.

The type of weakness, demonstrated by the foregoing example, can exist with other authentication schemes that are based on digest results of data. Because it is possible to map more than one set of data to the same digest result, it is possible for a clever programmer to break the authentication scheme and cause forged data to be mistaken for authentic data. In the above example, because the first weight factor, the number 2, was half the second weight factor, the number 4, the first data point was increased from 1 to 3 and the second was decreased from 3 to 2 thus canceling the effect of the increase in the first data point.

Therefore, a more secure system and method for verifying the integrity of a data of interest are needed that do not require storing redundant copies of data within a file.

SUMMARY

The present invention provides a system for authenticating data using incompatible digest functions. The system comprises a marking node and an authenticating node. The marking node comprises a data of interest identifier, a first digest creator, a second digest creator and a marking engine. The data of interest identifier identifies data to be subjected to the first and second digest creators. The first and second digest creators, using a first digest function and a second digest function respectively, create digests of the data of interest. The first digest function is incompatible with the second digest function. The marking engine then appends the digests to a file holding the data of interest.

The authenticating node comprises a data of interest identifier, a first digest creator, a second digest creator, a digest locator engine and a digest comparator engine. The data of interest identifier identifies data within a file that has been subjected to a two or more digest creator functions. The first and second digest creators are substantially identical to the first and second digest creators of the marking node and use the same digest functions. The digest locator engine locates a digest appended by the marking engine to the file holding the data of interest. The digest comparator engine compares the digests created by the authenticating node first and second digest creators with the digests appended to the file. If the authenticating node created digests match the stored digests, then the data is authenticate. If the digests do not match, then the data is not authentic (e.g., tampered with or incorrectly copied/transmitted).

The present invention further provides a method for marking data for authentication. The method comprises: identifying data of interest; creating, using a first function, a first digest for the data of interest; creating, using a second function that is incompatible with the first function, a second digest for the data of interest; identifying a location in the data of interest or file holding the data of interest to append the digests; and appending the digests to the identified location.

The present invention further provides a method of authenticating data that has been marked. The method comprises: locating appended digests; identifying data of interest; creating a first digest, using the first function, of the identified data of interest; creating a second digest, using the second function, of the identified data of interest; and comparing the created digests with located appended digests to verify authenticity of the data of interest.

Accordingly, the system and methods advantageously enable authentication of data.

BRIEF DESCRIPTION OF DRAWINGS

Non-limiting and non-exhaustive embodiments of the present invention are described with reference to the following figures, wherein like reference numerals refer to like parts throughout unless otherwise specified.

DETAILED DESCRIPTION

A method and system are disclosed for authenticating data of interest that make forgery nearly impossible. While using one digest function creates a digest result that can be forged, using two or more incompatible digest functions yields improved security.

Figure 1:
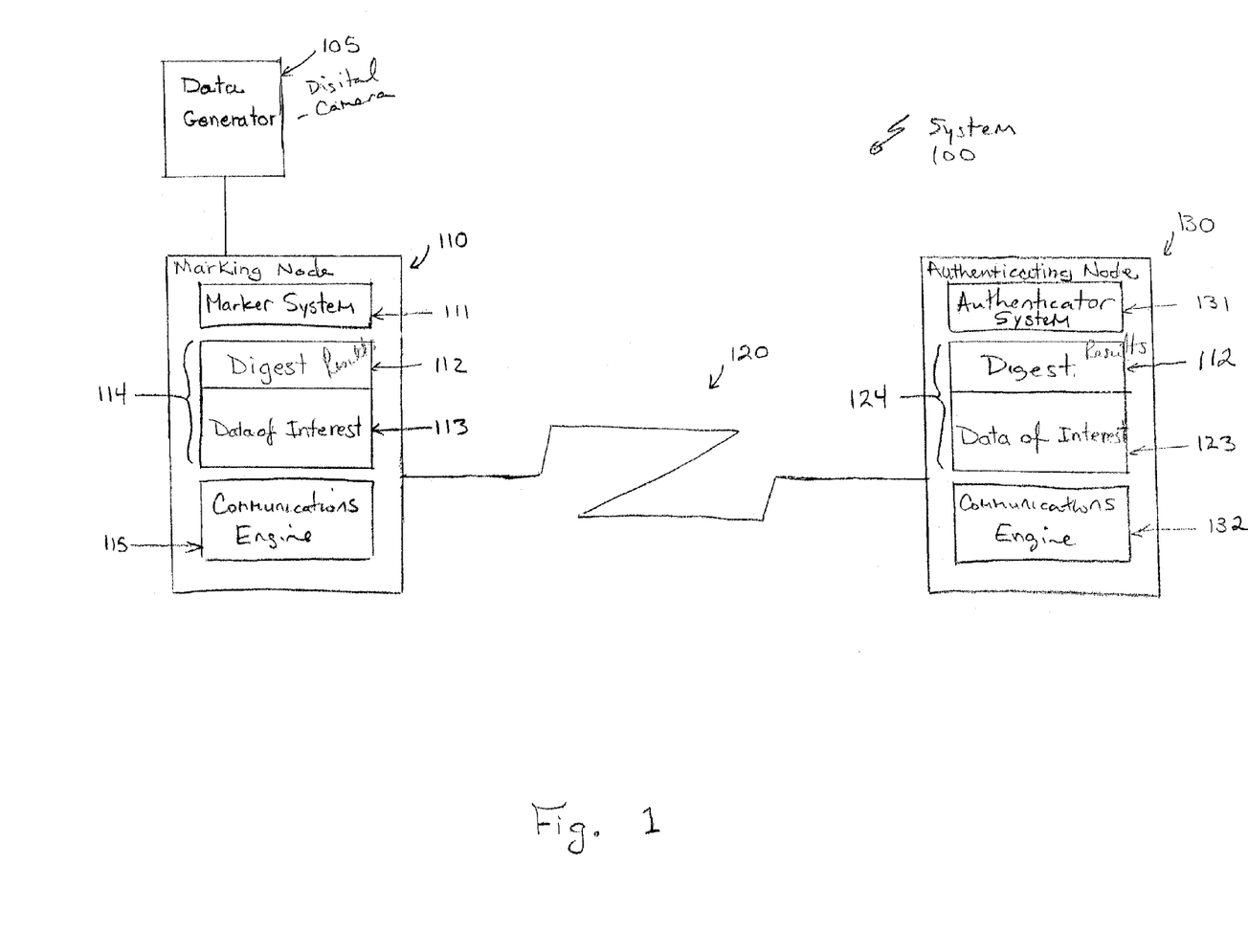
FIG. 1 is a block diagram of a marking and authenticating system in accordance with an embodiment of the present invention.

FIG. 1 is a block diagram of a marking and authenticating system 100 in accordance with an embodiment of the present invention. The system 100 comprises a data generator 105, a marking node 110, and an authenticating node 130. The marking node 110 may be a personal computer, mini-station, PDA, digital camera, digital video camera, or any type of client or server device. The authenticating node 130 may also be a personal computer, mini-station, PDA, digital camera, digital video camera, or any type of client or server device. The marking 110 and authenticating 130 nodes are connected via connection 120 which may comprise of a wired or a wireless communication method, a local area network, a wide area network, the Internet, or any similar connection. Alternatively, the marking 110 and authenticating 130 nodes may be included in the same device and the data flow between the nodes may be internal to the device. Yet another alternative system may consist of a device that authenticates data that it has processed itself or data that have been presented to it through a mobile storage medium. Examples of such device comprise of a digital camera that includes a marker and a PC that obtains its data from a floppy disk.

The marking node 110 is connected to the data generator 105. The data generator 105 may be a digital camera, word processor, scanner, microphone, keyboard, or any other device capable of creating digital data. The data generator 105 communicates the digital data to the marking node 110 automatically or upon request. Alternatively, the data may be transferred to the marking node 110 by a compact disk or other data storage medium. It will be appreciated that the data generator 105 and all or parts of the marking node 110 may be integral to the same device such as a digital camera used by police.

The marking node 110 comprises a marker system 111, a data file 114, which includes data of interest 113 and digest results 112 corresponding to the data of interest 113, and a communications engine 115. By creating two or more digest results 112 that correspond to the data of interest and storing the digest results in the file 114 containing the data of interest 113, the marker system 111 enables authentication of the data of interest 113. The details of the marker system will be provided with the discussion of FIG. 3. The communications engine 115 handles the communication of the data file 114 with digest results 112 from the marking node 110 to other destinations such as the authenticating node 130.

The authenticating node 130 comprises an authenticator system 131, a data file 124, and a communications engine 132. The data file 124 includes data of interest 123, that may be authentic or forged, and digest results 112 that were formed from the authentic data of interest 113. The authenticator system 131 performs the task of finding the digest results 112 within the data file 124 and, based on the digest results, determines whether the data of interest 123 received is authentic. Details of the authenticator system 131 will be provided with reference to FIG. 6. The communications engine 132 handles communication to and from the authenticator node 130.

Figure 2:
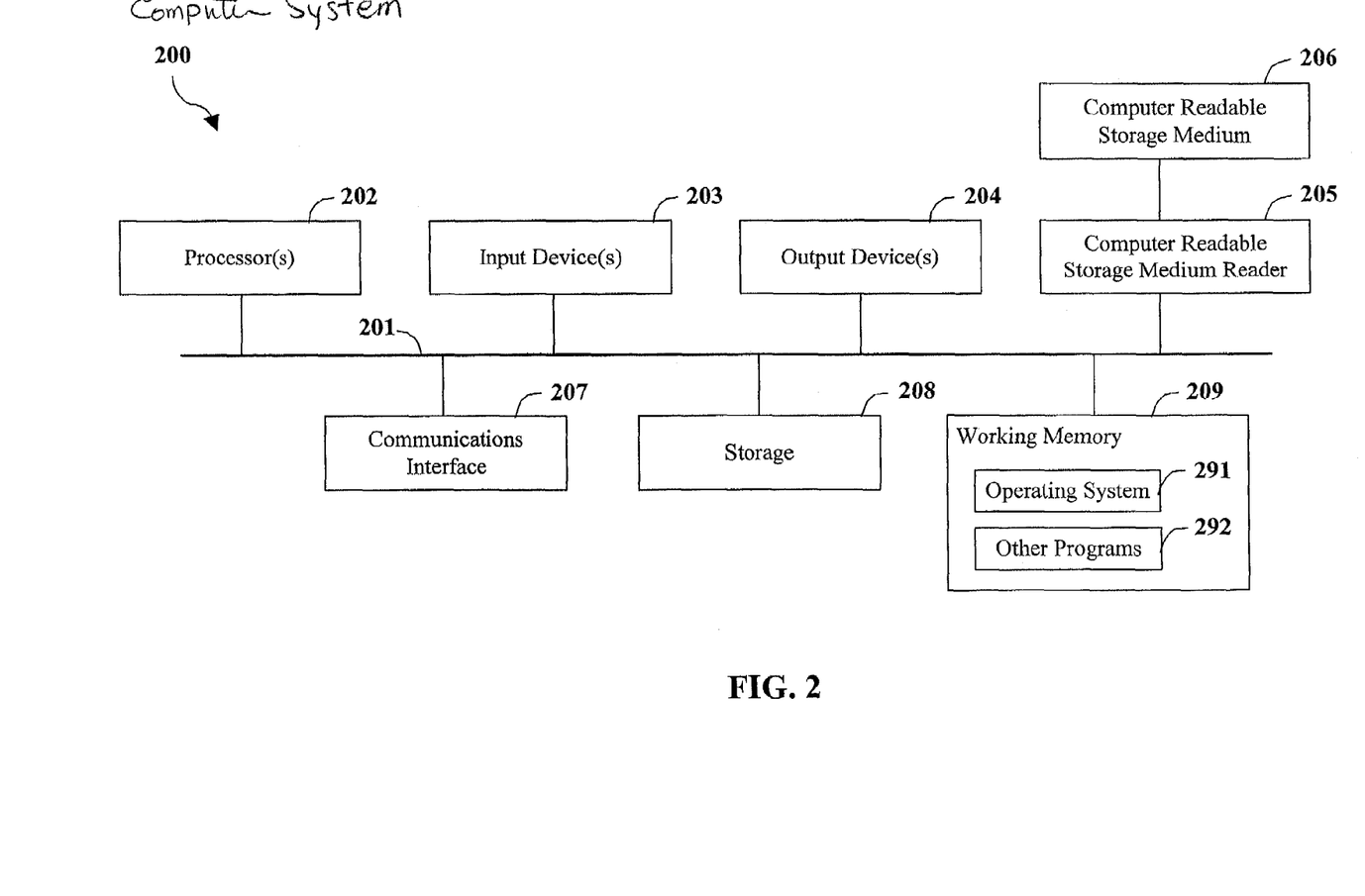
FIG. 2 is a block diagram of an example of a computer system.

FIG. 2 is a block diagram of an example computer system 200 which may form the marking node 110 or the authenticating node 130 and may encompass and operate the marker system 111 and the authenticator system 131. The computer system 200 of FIG. 2 comprises one or more processors 202 that process the data received through input devices 203 or available on storage media 208 and store the results of the processing in computer's working memory 209 or in permanent storage 208, or communicate it to an operator via a communications interface 207. The computer system 200 may further include computer readable storage media readers 205 such as floppy drives or CD or DVD drives as well as a computer readable storage medium 206 that may be read by the reader 205. The working memory 209 of the system further comprises an operating system 291 and other programs 292 that contribute to operations the computer system may perform. Various components of the computer system 200 are connected via a communication channel 201 such as a data bus.

The marker 111 and authenticator 131 systems will likely reside in permanent storage 208 before they are retrieved into the working memory 209 to operate on data files 114 and 124 that are received through the input devices 203 or are available from a computer readable storage medium 206. The authentication results may be communicated to the user via the communication interface 207 or the output devices 204 or stored in storage 208 or working memory 209 of the computer.

Figure 3:
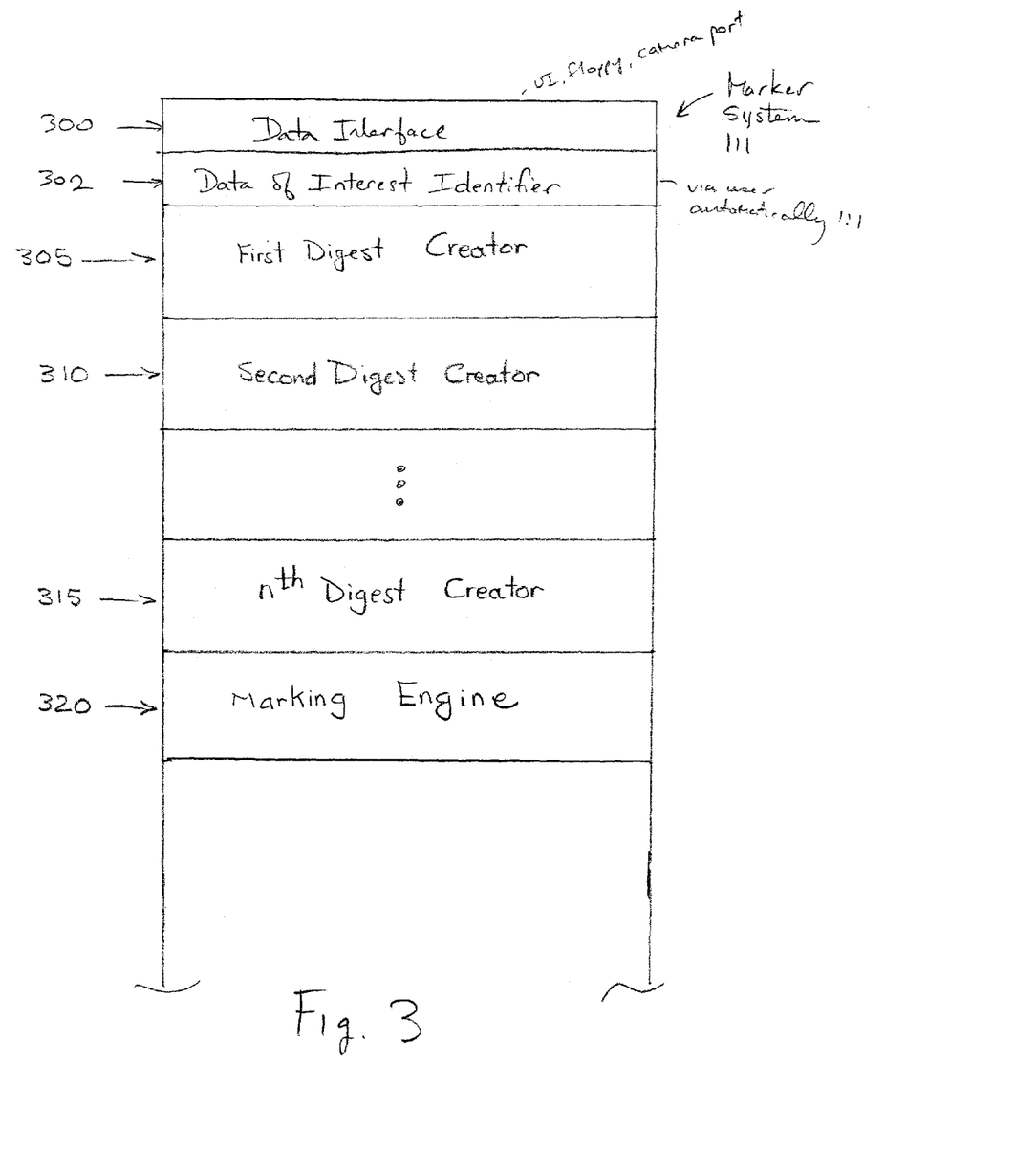
FIG. 3 is a block diagram illustrating details of a marker system.

FIG. 3 is a block diagram illustrating details of the marker system 111. The marker system 111 comprises a data interface system 300 that may include any user interface device such as a floppy drive or a camera port, a system for identifying the data of interest 302, a first digest creator 305, a second digest creator, 310, and a marking engine 320. More than two digest creators 315 may be included in the marker system 111. The file or files containing the data of interest 114 are accessed by the marker system 111 through the data interface 300. The data of interest identifier 305 subsequently finds the data of interest 113 that needs to be marked for future authentication. The identification process may be performed automatically, for example, by a parser that reads a file or multiple files and identifies the data of interest. Alternatively, a user may identify the data of interest 113 to the marker system 111. The first digest creator 305 performs digest operations on the data of interest to generate a digest result 112. The second 310 and consecutive 315 digest creators, in turn, perform digest operations on the data of interest 113 to generate the subsequent digest results 112. Each digest creator uses a different incompatible digest calculation function. The marking engine 320, then attaches the digest results 112 to the file 114 containing the data of interest 113.

Figure 4:
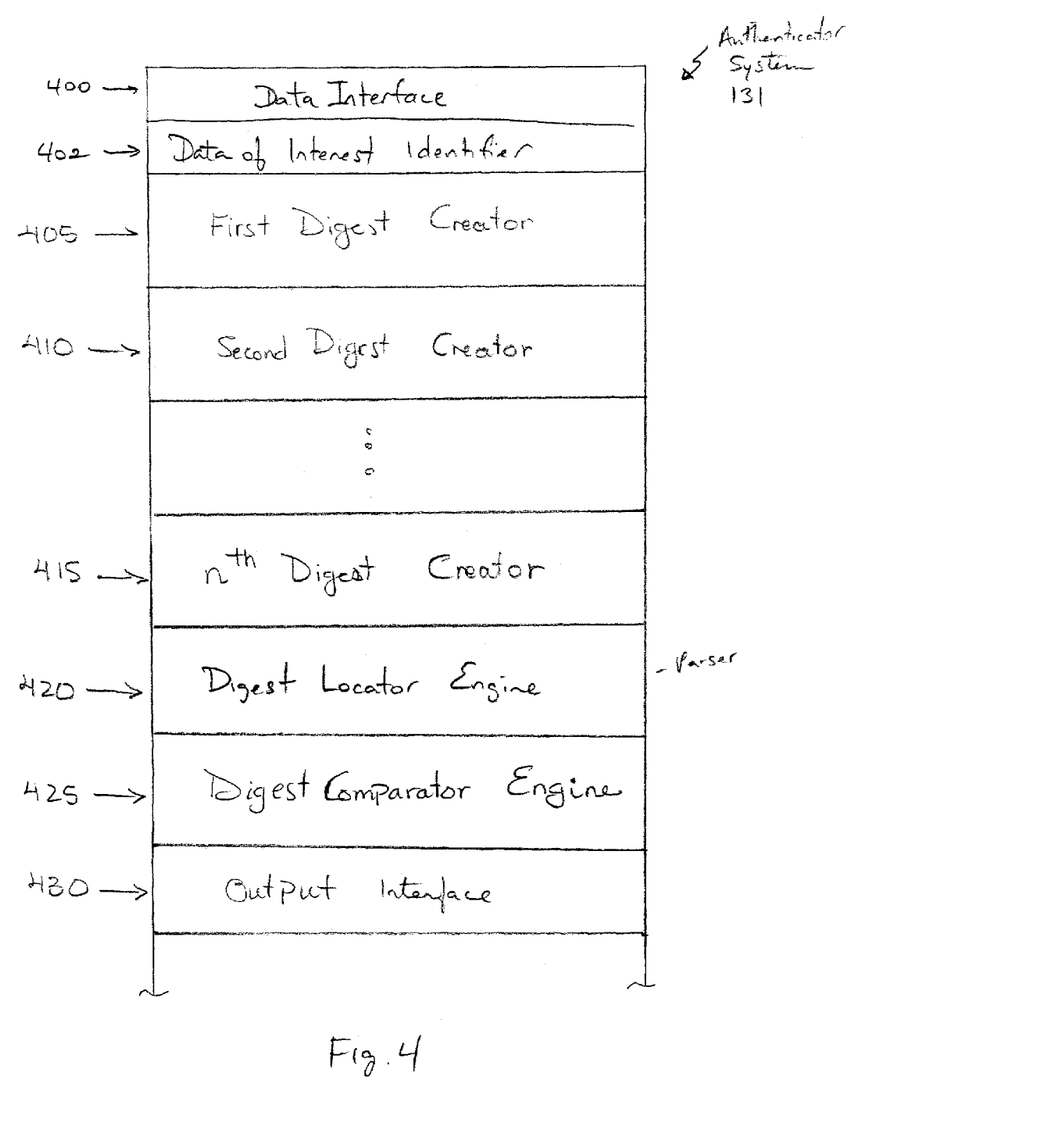
FIG. 4 is a block diagram illustrating details of an authenticator system.

FIG. 4 is a block diagram illustrating details of the authenticator system 131. The authenticator system 131 comprises a data interface system 400 that may include any user interface device such as a floppy drive or a camera port, a system for identifying the data of interest 402, a first digest creator 405, a second digest creator, 410, a digest locator engine 420, a digest comparator engine 425, and an output interface 430. More than two digest creators 415 may be included in the authenticator system 131. The file or files 124 containing the data of interest 123 are accessed by the authenticator system 131 through the data interface 400. The data of interest identifier 402 subsequently finds the data of interest 123 that has been marked by the marker system 111 and needs to be authenticated. The identification process may be performed automatically, for example, by a parser that reads the file or files containing the data of interest and identifies the data of interest. Alternatively, a user may identify the data of interest 123 to the authenticator system 131. The first digest creator 405, using the same digest calculation function as digest creator 305, performs digest operations on the data of interest 123 to generate a digest result (not shown). The second 410 and consecutive 415 digest creators, in turn, using the same digest calculation functions as digest creators 310 and 315 respectively, perform digest operations on the data of interest 123 to generate the subsequent digest results (not shown). The digest locator engine 420, then locates the digest results 112 created by the marker 111 and attached to the file 114 containing the data of interest 113. As these digest results 112 may be hidden in or appended to the file 114 containing the data of interest 113, the digest locator must be a parser capable of deciphering the format of the file 124. Alternatively, the digest results 112 created by the marker 111 may be input to the authenticator 131 by the user. The digest comparator engine 425 then compares the digest results (not shown) created by the digest creators 405-415 of the authenticator system 131 against the digest results 112 created by the marker system 111. The outcome of the comparison is then presented to the user via the output interface 430.

It is appreciated that if an authentic copy of the file 114 containing the data of interest 113 is received by the authenticating node 130, then the file 124 at the authenticating node 130 will be the same as file 114 and the data of interest 123 in that file 124 will be the same as data of interest 113. Different reference numerals used for the data files 114 and 124 and the data of interest 113 and 123 at the marking node 110 and the authenticating node 130 respectively reflect the scenario that a forged set of data of interest 123 may be present at the authenticating node 130. The digest results 112 refer to the results of performing the digest operations on the authentic of data of interest 113 that are attached to that data 113 and are assumed to be unaltered.

Figure 5:
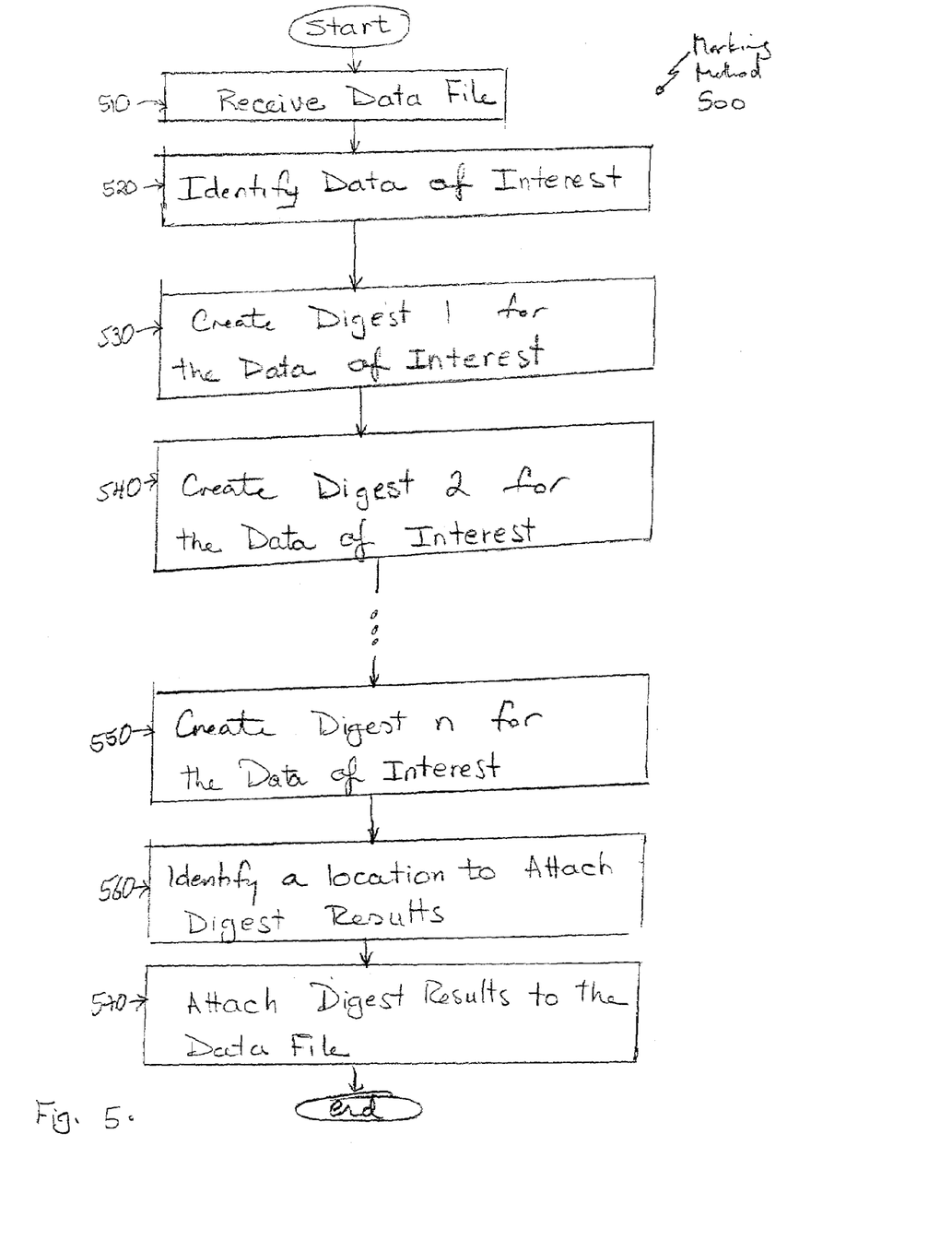
FIG. 5 is a flowchart illustrating a method of marking data of interest.

FIG. 5 is a flowchart illustrating a method 500 of marking the data of interest 113. First the marker system 111 receives (510) one or more data files from a data generator 105 or any other source of data. Next, the data of interest identifier 302 identified (520) the data of interest 113 to the marker system 111. Alternatively, a user may identify the data of interest 113. The data of interest 113 may include one or more data files or may be comprised of subsets of one or more of the data files received. The data of interest 113 may be identified based on rules and conventions set by the user or may be directly identified by the user. The first digest creator 305 then creates (530) a first digest result for the data of interest 113. Digest creators 310-315 then create (540, 550) a second and further digest results for the data of interest 113 identified by the identifier 302. At least two digest results must be created. Creating more than two digest results is not required but increases the security of data authentication. After having created (530-550) the two or more digest results, the marking engine 320 identifies (560) a location to attach the digest results. The locations for attaching the digest results may be provided by the user or automatically selected by the marker engine 320. The digest results 112 are then attached (570) to the file or the files containing the data of interest 114. Details regarding the possible locations for attaching the digest results are provided in FIGS. 9 and 10.

It is appreciated that not all of the order presented in the flowchart of FIG. 5 is essential to the invention. After the files containing the data of interest 114 are received by the marker system 111, the locations to attach (570) the digest results 112 may be identified (560) before the data of interest 113 are identified and the digest results 112 are created (530-550). The location of the digest results may even be decided by the user ahead of receiving (510) any data or may be identified by a preset rule that, for example, always attaches (570) the digest result after the end of a file marker. It is also appreciated that the order of the creating the digest results are not material. It is however appreciated that the data of interest 113 must be identified (520) before the digest results are created (530-550) or attached to the data file (570).

Figure 6:
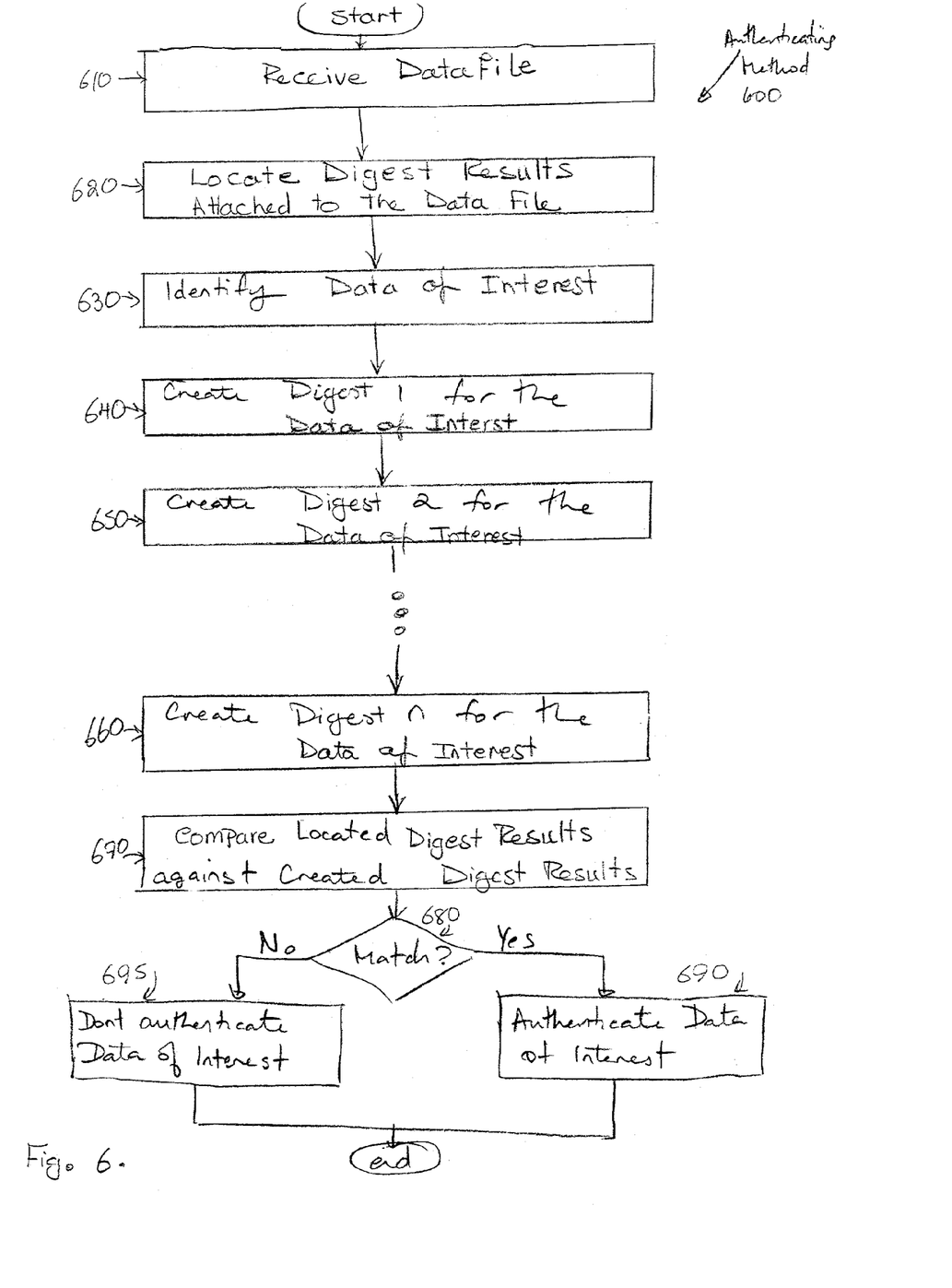
FIG. 6 is a flowchart illustrating a method of authenticating data of interest.

FIG. 6 is a flowchart illustrating a method 600 of authenticating the data of interest 113. First the authenticator system 131 receives (610) a file 124 containing the data of interest 123 through its data interface 400. Then, the digest locator engine 420 of the authenticator system 131 locates (620) the digest results 112 that are attached to the file 124 containing the data of interest 123. Locating the digest results 112 may be accomplished with the help of a parser that parses the file 124 and locates the digest results 112; it may be alternatively achieved by directly inputting the locations of the digest results 112 to the digest locator 420. Before, after, or simultaneous with locating (620) the digest results 620, data of interest identifier 402 of the authenticator system 131 identifies (630) the data of interest 123. Then, the first, second, and subsequent digest creators (405-415) create (640-660) first, second and subsequent digests respectively for the data of interest 123. The digest comparator engine 425 of the authenticator system 131 then compares (670) the located digest results 112 against the created digest results (not shown). The created first digest result is compared against the located first digest result, the created second digest result is compared against the located second digest result, and subsequent created digest results, if any, are compared against the subsequent located digest results in a like manner such that the results of the same digest functions are compared. If a match is found between all pairs, the output interface 430 of the authenticator system 131 indicates (690) that the data of interest 123 received at the authenticator node 130 is authentic and an equivalent of the data of interest 113 at the marking node 110. If a match is not found between one of, or more than one of the digest results and the corresponding located digest results, the output interface 430 of the authenticator system 131 indicates (695) that the data of interest 123 is not authentic.

It is appreciated that not all of the order presented in the flowchart of FIG. 6 is essential to the invention.

Figure 7:
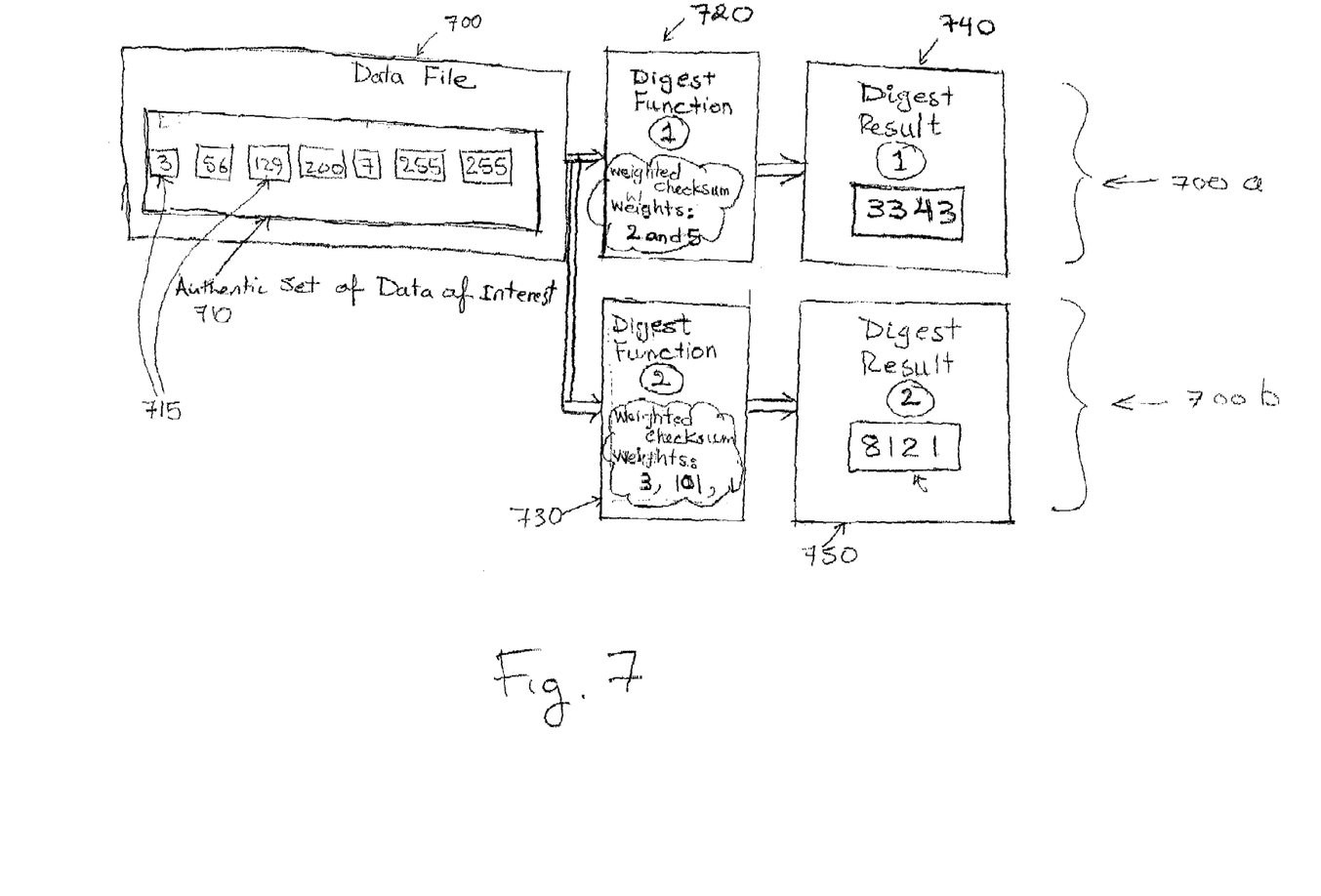
FIG. 7 is a flowchart illustrating a method of using two digest results with incompatible digest functions.

FIG. 7 is a flowchart illustrating a method of using digest results with incompatible digest functions. For the sake of simplicity, application of only two incompatible digest functions to an authentic data set is shown. More than two incompatible digest functions may be used. Using more than two incompatible digest functions may increase security.

Digest function one 720 and digest function two 730 are incompatible in the sense that if applying digest function one to a first data set yields digest result one and applying the second digest function to the same first data set yields digest result two, applying the first digest function to a second different data set will likely not yield digest result one when applying the second digest function to the second different data set yields digest function two, or alternatively applying the second digest function to the second different data set will likely not yield digest result two when applying the first digest function to the second different data set yields digest function one. In other words, in the case of incompatible digest functions there is a very small possibility that two or more differing data sets simultaneously satisfy all digest functions identically.

In FIG. 7, an authentic set of data of interest 710 consisting of data points 3, 56, 129, 200, 7, 255, and 255 is subject to incompatible digest functions one 720 and two 730. Digest function one 720 is a weighted checksum with weight values of 2 and 5 that repeat periodically until all of the data points are exhausted. Digest function two 730 is also a weighted checksum with weight values of 3, 101, and 1 that repeat periodically until all of the data points are exhausted. Applying these digest function to the authentic set 710 yields digest results one 740 and two 750. Digest result one 740 will have a value of 3343 calculated as follows:

Digest result one=2*3+5*56+2*129+5*200+2*7+ 5*255+2*255=3343.

Digest result two 750 will have a value of 8121 calculated as follows:

Digest result two=3*3+101*56+1*129+3*200+ 101*7+1*255+3*255=8121.

The two digest functions are chosen such that running another set of data points through them is not likely to yield the same two digest results simultaneously. Therefore, a forged data set may not be passed on in place of an authentic set.

Figure 8:
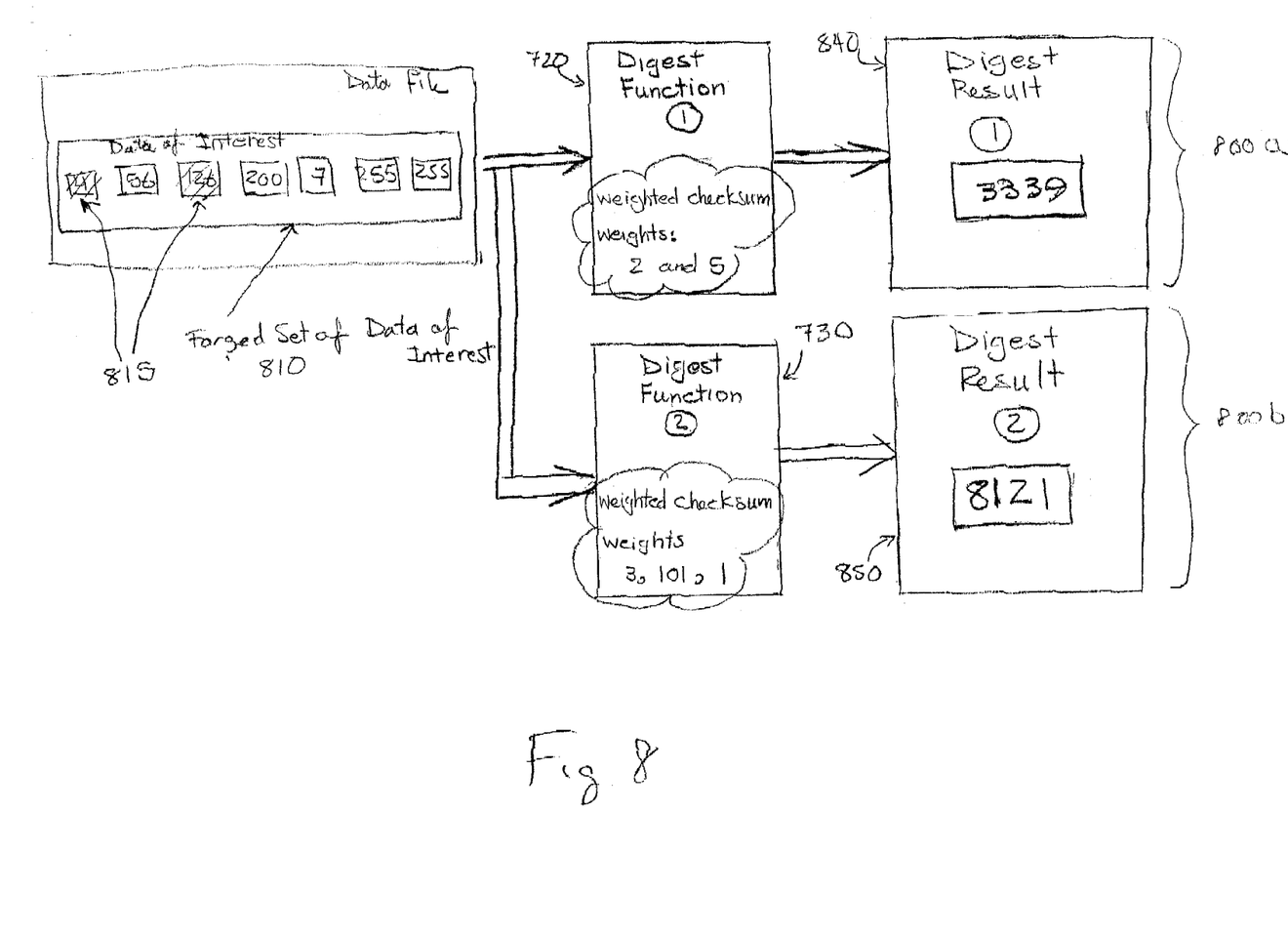
FIG. 8 is a flowchart illustrating a method of applying incompatible digest functions to a forged data set.

FIG. 8 is a flowchart illustrating a method of applying incompatible digest functions to a forged set of data 810. For the sake of simplicity, application of only two incompatible digest functions is shown. In the forged set 810, two of the original data points 715 have been modified in such a way as to compensate for the effect of the second digest function 730. The data point 3 has been replaced by 4 and, to compensate the effect of this increase, data point 129 has been replaced by 126. Using the second digest function 730 will yield a second digest result 850 for the forged set 810 with a value of 8121 which is equal to the value of the digest result 750 resulting from running the authentic set through the second digest function 730. However, the data points of the forged set 810 have not been modified with the weights of the first digest function 720 in mind and the two digest functions are such that these data values could not be modified to simultaneously deceive both the first 720 and the second 730 digest functions. Therefore, applying the first digest function 720 to the forged set 810 yields a digest result 840 with a value of 3339 which is different from the value of the first digest result corresponding to the authentic set 710 that was 3343.

FIGS. 7 and 8 demonstrate that using two or more incompatible digest functions to a data set will yield digest results that are not likely to simultaneously correspond to any other data set. Consequently, a forged data set cannot be passed on as authentic. In the examples set forth in FIGS. 7 and 8, the ratio of the first to third weights in the first digest function 720 is one to one (2:2) and the ratio of the first to third weights in the second digest function 730 is three to one (3:1). This incompatibility means that if a data set is manipulated to satisfy the first digest function it will not be able to simultaneously satisfy the second digest function.

A person skilled in the art will recognize that the approach of using two incompatible digest functions can be generalized to two or more incompatible digest functions. Further, the digest functions may be of many various types such as hash functions, checksums, weighted checksums, one-way encryption functions or any other type of digest function that can be applied to a set of data.

Digest functions may be periodic or aperiodic. Periodic digest functions, such as the weighted sum function depicted in FIGS. 7 and 8, repeat with a period that is equal to the number of their weights. As shown in FIG. 7, the first digest function 720 has 2 weights and a period of 2 because the weights repeat after two data points. The second digest function 730 has 3 weights and a period of 3 because the weights repeat after 3 data points. An exclusive or function (XOR) is an example of an aperiodic digest function. In an XOR function, each byte of the data of interest is combined with the previous bytes using an XOR function which results in the union of the parts the two bytes do not have in common. In a truth table, the result of an XOR function is true only when one of the combined bytes is true and not when both are true or when both are false.

The overall period of a number of incompatible digest functions used together is equal to the product of the periods of the functions. For improved security, it is desired to use digest functions with large periods and to have a different period length for each digest function used. Security is further enhanced if the overall period length of the combination of digest functions exceeds the length of the data of interest.

Digest functions with no set period, such as the XOR function, do not suffer from periodic effect. The length of the period for these functions can be considered to be infinite. In order to form a set of incompatible digest functions, both periodic and aperiodic digest functions may be included. For additional security, it is preferred but not required that some of each type of digest functions are mixed together to form a set of digest functions that is applied to the data of interest.

Figure 9:
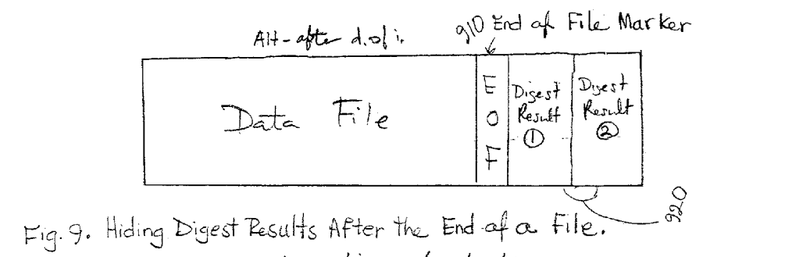
FIG. 9 illustrates a method of appending digest results after an end of file marker.
Figure 10:
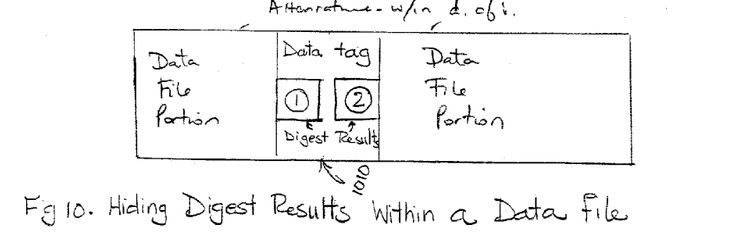
FIG. 10 illustrates a method of appending digest results within a data file.

An important issue regarding authentication of data files arises from the need to hide the digest results so that they are not apparent to a file parser. FIGS. 9 and 10 are block diagrams of methods of hiding the digest results attached to a data file.

FIG. 9 is a block diagram of a method of placing digest results after an end of file (EOF) marker 910. Common file types use some way of marking the end of the file 910. Examples of end of file markers are special bytes at the end of the data, a byte count inserted at some point in the data file that tells the parser where the end of the files is, or a file length marked for the file by the operating system. If in the data of interest 710 the only place where two consecutive "255" value bytes were allowed was at the end of the file, the two consecutive "255" bytes would be referred to as the EOF marker. Parsers of this kind of file would normally read the bytes up to but not past the EOF marker. If we add information beyond the EOF marker, that information would be invisible to parsers. Storage beyond 920 the EOF marker 910 is therefore an ideal place to place the digest results. These results need not be stored as is but may be manipulated by various operations such as encryption, hash functions, one or two way hashes or other methods that increase security. If the two digest results of FIG. 7 were each stored in two-byte integers, a total of four bytes would be added after the two consecutive "255" data values to store the two digest results with or without encryption, or other added security measures. Other information may also be stored in the file after the EOF marker. Such non-digest information may include, for example in the case of a digital photograph, photographer's digital signature, camera model and serial number, photography time, password, or any other type of information that may be important to the user.

FIG. 10 illustrates a method of hiding digest results within a data file as opposed to at the end of the file. Information may be hidden within a file in fields that parsers that are not specifically designed to discover the field do not understand. Some file formats allow generalized tags 1010 for information within the file. Jpeg files are one such type of file. Jpeg files allow insertion of data that can be meaningless to a parser unless the parser was specifically designed to handle such data. Digest results and other data can be stored within the data set of interest as a tagged block of data 1010. This information can be further protected from unauthorized viewing by encryption, hash functions, one or two way hashing, or other similar methods.

Figure 11:
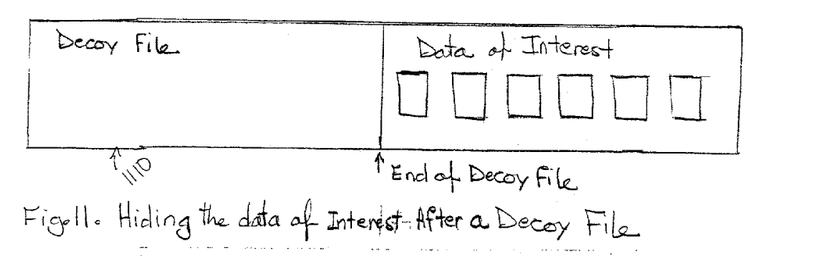
FIG. 11 illustrates a method of using a decoy file to hide data of interest.
Figure 12:
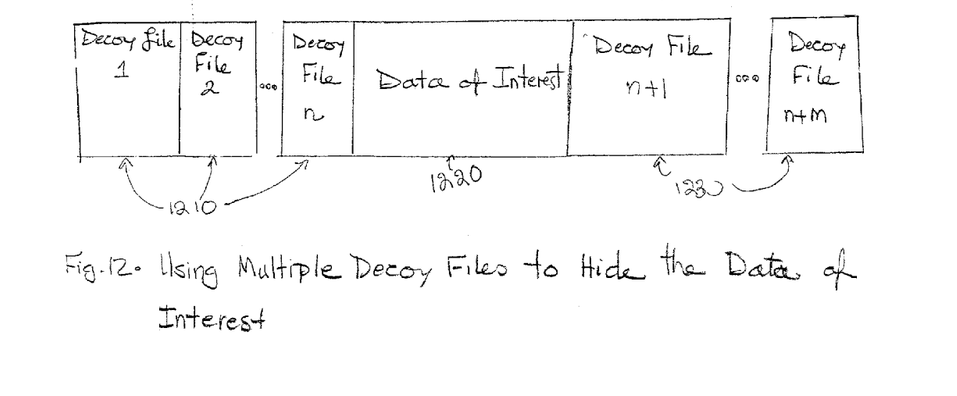
FIG. 12 illustrates a method of using several decoy files to hide data of interest.

FIGS. 11 and 12 do not relate to method of hiding digest results rather to methods of hiding data of interest itself. FIG. 11 illustrates a method of using a decoy file 1110 to hide data of interest. FIG. 12 illustrates a method of using several decoy files 1210 to hide data of interest. One or more decoy files may be inserted before the data set of interest 1220 begins 1210 or after this data set ends 1230. The parser will read the decoy data thinking that it has read the real data and will not reach the data of interest.

The foregoing description of the embodiments is by way of example only, and other variations and modifications of the above-described embodiments and methods are possible in light of the foregoing teaching. The embodiments described herein are not intended to be exhaustive or limiting. The present invention is limited only by the following claims.

What is claimed is:

1. A method, comprising the steps:
    creating, using a first digest function, a first digest of a data of interest;
    creating, using a second digest function that is incompatible with said first digest function, a second digest of said data of interest, said first digest and said second digest undeceptively identifying said data of interest; and
    appending said first digest and said second digest to a file holding said data of interest to create said file including said first digest, said second digest and said data of interest.

2. The method of claim 1, wherein the step appending further comprises the step:
    appending said first digest and said second digest to the end of said file.

3. The method of claim 1, wherein the step appending, further comprises the step:
    appending said first digest and said second digest hides said first digest and said second digest within said data of interest in said file.

4. The method of claim 1, wherein said data of interest is identified by a user.

5. The method of claim 1, wherein said first digest function and said second digest function each include a checksum function.

6. The method of claim 1, wherein said first digest function and said second digest function each include a weighted checksum function.

7. The method of claim 1, wherein said first digest function and said second digest function each include at least one periodic function.

8. The method of claim 7, wherein said first digest function and said second digest function have different periods.

9. The method of claim 1, wherein said first digest function and said second digest function each include at least one aperiodic function.

10. The method of claim 1, further comprising the steps:
    creating additional digests of said set of data using additional digest functions that are incompatible with one another; and
    appending said additional digests to said file holding data of interest.

11. A system, implementing the method of claim 1, comprising:
    means for creating, using said first digest function, said first digest of said data of interest;

means for creating, using said second digest function that is incompatible with said first digest function, said second digest of said data of interest; and means for appending said first digest and said second digest to said file holding said data of interest.

12. A computer-readable medium storing instructions to cause a computer to execute the method of claim 1.

13. A system implementing the method of claim 1, comprising:
a first digest creator capable to create, using said first digest function, said first digest of said data of interest;
a second digest creator capable to create, using said second digest function that is incompatible with said first digest function, said second digest of said data of interest; and
a marking engine, communicatively coupled to said first digest creator and said second digest creator, capable to append said first digest and said second digest to said file holding said data of interest.

14. The method of claim 1, further comprising the step: identifying said data of interest.

15. The method of claim 14, further comprising the step: receiving a data file; and
wherein the step identifying, further comprises the step: identifying said data of interest in said data file.

16. The file including said first digest, said second digest and said data of interest, as a product of the process of claim 1.

17. A method, comprising:
locating a first digest result and a second digest result in a file, said file including data of interest, and said first digest result and said second digest result undeceptively identifying said data of interest;
creating, using a first digest function, a first digest of said data of interest, said first digest function being identical to a digest function used to create said first digest result;
creating, using a second digest function that is incompatible with said first digest function, a second digest of said data of interest, said second digest function being identical to a second digest function used to create said second digest result; and
comparing said first digest and said second digest with said first digest result and said second digest result respectively to create a match of the digests to undeceivably authenticate said data of interest:

18. The method of claim 17, further comprising, the step:
displaying a positive authentication message if said match of said digests indicates said first digest and said second digest match said first digest result and said second digest result respectively undeceivably authenticating said data of interest.

19. The positive authentication message as a product of the process of claim 18.

20. The method of claim 17, wherein said data of interest is identified by a user.

21. The method of claim 17, wherein said first digest function and said second digest function each include a checksum function.

22. The method of claim 17, wherein said first digest function and said second digest function include a weighted checksum function.

23. The method of claim17, wherein said first digest function and said second digest function include at least one periodic function.

24. The method of claim 23, wherein said first digest function and said second digest function have different periods 25. The method of claim 17, wherein said first digest function and said second digest function each include at least one aperiodic function.

26. The method of claim 17, further comprising:
locating additional digest results in said file, said data file including said set of data;
creating, using additional digest functions that are incompatible with one another, additional digests of said set of data, said additional digest functions being identical to said additional digest functions used to create said additional digest results in said file; and
comparing said additional digests with said additional digest results respectively to further create said match.

27. A system implementing the method of claim 17, comprising:
means for locating said first digest result and said second digest result in said file, said file including said data of interest;
means for creating, using said first digest function, said first digest of said data of interest, said first digest function being identical to said digest function used to create said first digest result;
means for creating, using said second digest function that is incompatible with said first digest function, said second digest of said data of interest, said second digest function being identical to said second digest function used to create said second digest result; and
means for comparing said first digest and said second created digests with said first digest result and said second digest result respectively to create a match of the digests.

28. A computer-readable medium storing instructions to cause a computer to execute the method of claim 17.

29. A system implementing the method of claim 17, comprising:
a digest locator engine capable to locate said first digest result and said second digest result in said file, including said data of interest;
a first digest creator capable to create, using said first digest function, said first digest of said data of interest, said first digest function being identical to said digest function used to create said first digest result;
a second digest creator capable to create, using said second digest function that is incompatible with said first digest function, said second digest of said data of interest, said second digest function being identical to said second digest function used to create said second digest result; and
a digest comparator engine, communicatively coupled to said digest locator engine, said first digest creator and said second digest creator, capable to compare said first digest and said second digest with said first result and said second digest result respectively to create said match of said digests.

30. The system of claim 29, further comprising:
an output interface, communicatively coupled to said digest comparator engine, capable to display a positive authentication message if said match indicates said first digest and said second digest match said first digest result and said second result respectively.

31. The system of claim 29,
wherein the digest locator is further capable to locate additional digest results in said file and
wherein the system further comprises
additional digest creators capable to create, using additional digest functions that are incompatible with one another, additional digests of said data, of interest, said additional digest functions being identical to digest functions used to create said additional digest results, and wherein said digest comparator engine, further communicatively coupled to said additional digest creators, is further capable to compare the additional created digests with said additional digest results respectively to further create said match.

32. The match of said digests as a product of the process of claim 17.

33. A method of marking, comprising the steps:
identifying data of interest in a data file;
creating, using N digest functions, N digests of said data of interest; wherein said N is at least two, and said N digests undeceptively identify said data of interest; and
appending said N of said digests to a file holding said data of interest to create said file including said N digests and said data of interest.

34. The method of claim 33, wherein said N is at least three.

35. The method of claim 33, wherein the step of appending further comprises the step:
appending at least two of said digests to the end of said file.

36. The method of claim 35, wherein the step of appending further comprises the step:
appending all of said N of said digests to the end of said file.

37. The method of claim 33, wherein the step of appending, further comprises the step:
appending said N of said digests hides at least two of said digests within said data of interest in said file.

38. The method of claim 37, wherein the step of appending, further comprises the step:
appending said N of said digests hides all of said N of said digests within said data of interest in said file.

39. The method of claim 33, wherein the step of identifying further comprising the step:
identifying by a user said data of interest in said data file.

40. The method of claim 33, wherein at least two of said digest functions each include a checksum function.

41. The method of claim 40, wherein all of said N of said digest functions each include said checksum function.

42. The method of claim 33, wherein at least two of said digest functions each include a weighted checksum function.

43. The method of claim 42, wherein all of said N of said digest functions each include said weighted checksum function.

44. The method of claim 33, wherein at least two of said digest functions each include at least one periodic function.

45. The method of claim 44, wherein said at least two of said digest functions have different periods.

46. The method of claim 45, wherein all of said N of said digest functions each include said at least one periodic function.

47. The method of claim 33, wherein at least two of said digest functions each include at least one aperiodic function.

48. The method of claim 47, wherein all of said N of said digest functions each include said at least one aperiodic function.

49. A system implementing the method of claim 33, comprising:
means for identifying said data of interest in said data file;
for each of said N of said digest functions, means for creating using said digest function to create said digest of said data of interest; and
means for appending each of said digests for said N of said digest functions to said file holding said data of interest.

50. A computer-readable medium storing instructions to cause a computer to execute the method of claim 33.

51. The file including said N digests and said data of interest, as a product of the process of claim 33.

52. A method of using said file including said N digests and said data of interest of claim 51, comprising the steps:
locating said N of digest results in said file;
for at least two of said digest results, creating a respective digest using said digest function used to create said digest result; and
comparing each of said at least two of said digest results to said respective digest of said digest result to create a match of the digests to undeceivably authenticate said data of interest.

53. The method of claim 52, further comprising:
for all of said N of said digest results, creating said respective digest using said digest function used to create said digest result; and
wherein the step of comparing, further comprises the step:
comparing each said N of said digest results to said respective digest to further create said match of said digests.

54. The method of claim 52, further comprising the step:
displaying a positive authentication message if said match of said digests indicates each of said at least two of said digest results match said respective digest of said digest result.

55. The positive authentication message as a product of the process of claim 54.

56. The match of said digests, as a product of the process of claim 52.

57. A system implementing method of claim 52, comprising:
means for locating said N of said digest results in said file holding said data of interest;
for at least two of said digest results, means for creating said respective digest using said digest function used to create said digest result; and
means for comparing each said at least two of said digest results to said respective digest to create a match of the digests.

58. The system of claim 57, further implementing the method of marking, further comprising:
means for identifying said data of interest in said data file;
for each of said N of said digest functions, means for creating using said digest function to create said digest of said data of interest; and
means for appending each of said digests for said N of said digest functions to said file holding said data of interest.

59. A system implementing the method of claim 52, comprising:
a digest locator engine capable to locate at least two digest results in said file holding said data of interest;
for each of said at least two digest results, a digest creator capable using said digest function of said data of interest to create a respective digest, whereby said digest function being identical to said digest function used to create said digest result; and
a digest comparator engine, communicatively coupled to said digest locator engine, and each of said digest creators, capable to compare said at least two digest results with said respective digest, for each of said at least two digest results to create said match of said digests.

60. The system of claim 59, further comprising:
for each of said N of said digest results, a digest creator capable using said digest function of said data of interest to create a respective digest, whereby said digest function being identical to said digest function used to create said digest result; and wherein said digest comparator engine, further comprises:

said digest comparator engine communicatively coupled to said digest creator, creating said digest by said digest function used to create said digest result, for each of said N of said digest results, and capable to compare said digest result to said respective digest, for each of said N of said digest results.

61. The system of claim 59, further comprising:

an output interface, communicatively coupled to said digest comparator engine, capable to display a positive authentication message if said match indicates said digest result matches and said respective digest, for each of said at least two of said digest results.

62. A computer-readable medium storing instructions to cause a computer to execute the method of claim 52.

* * * * *